United States Patent [19]

Younger

[11] Patent Number: 5,743,823
[45] Date of Patent: Apr. 28, 1998

[54] METHODS AND SYSTEMS FOR IMPROVING THE OPERATION OF TRANSMISSIONS FOR MOTOR VEHICLES

[76] Inventor: Gilbert W. Younger, 2621 Merced Ave., El Monte, Calif. 91733

[21] Appl. No.: 595,810

[22] Filed: Feb. 2, 1996

[51] Int. Cl.⁶ ........................................... F16H 3/62
[52] U.S. Cl. ........................................ 475/120; 477/142
[58] Field of Search ........................... 475/120, 121, 475/122; 477/130, 134, 137, 142

[56] References Cited

U.S. PATENT DOCUMENTS

| | | | |
|---|---|---|---|
| 4,468,989 | 9/1984 | Rosen | 475/120 X |
| 4,495,839 | 1/1985 | Morscheck | 477/142 |
| 5,472,389 | 12/1995 | Ando et al. | 477/142 X |
| 5,540,628 | 7/1996 | Younger | 475/120 |

*Primary Examiner*—Khoi Q. Ta
*Attorney, Agent, or Firm*—Mark P. Stone

[57] ABSTRACT

Method and systems are provided for improving the operation of a transmission for an automotive vehicle, and in particular the transmission as installed by the original automobile manufacturer. The methods and systems of the present invention modify the original hydraulic fluid circuits of the automotive transmission provided by the automobile manufacturer to enable the transmission to manually select any available ratio at any time, to select first gear at any time, and to enable the transmission to produce quick applies during upshifts and fast releases during downshifts for improved performance and heavy duty use with only minimum ratio sharing or overlap during gear changes. The modification of the original automotive transmission to achieve these goals includes adjustment of the hydraulic fluid circuits by providing a new 1-2 shift valve, by providing new hydraulic flow circuits, by discontinuing use of existing hydraulic circuits, by enlarging the size of pre-existing orifices and by plugging other orifices, and by adjusting pre-existing spring and pressure values; all of which adjust the fluid flow and operation of the original factory installed automotive transmission in accordance with the basic objectives of the present invention.

20 Claims, 5 Drawing Sheets

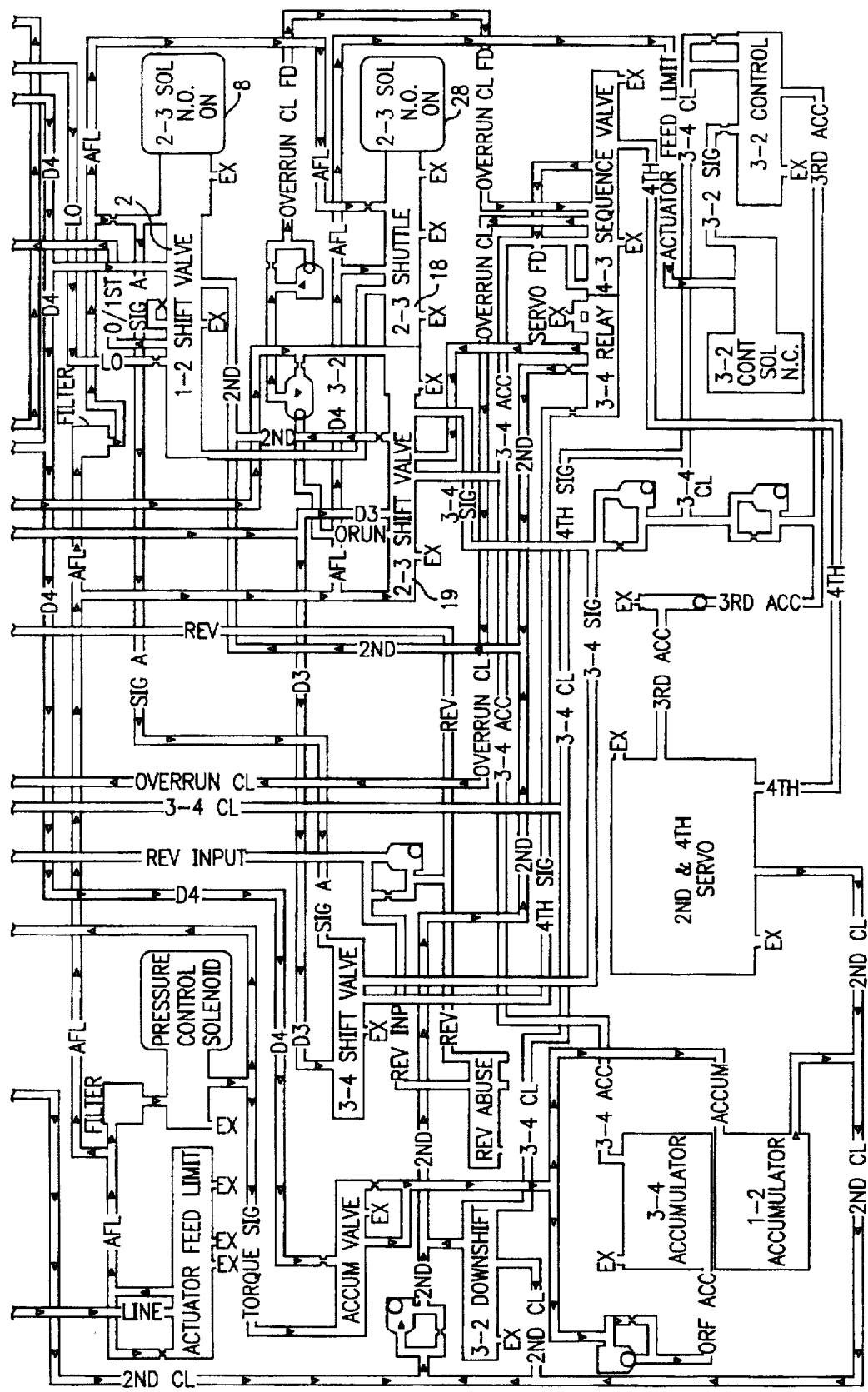
FIG. IB (PRIOR ART)

METHODS AND SYSTEMS FOR IMPROVING THE OPERATION OF TRANSMISSIONS FOR MOTOR VEHICLES

BACKGROUND OF THE INVENTION

The methods and systems of the present invention are directed to the modification and improvement of transmissions for automotive vehicles of the type installed by the original equipment manufacturers. The invention is particularly directed to the improvement and modification of the automotive transmissions commonly known as the "4L60E" or the "Hydramatic 4L60E" which are "factory installed" in automotive vehicles manufactured by General Motors Corporation.

The present inventor owns U.S. Pat. No. 5,253,549, issued Oct. 19, 1993 and entitled "Methods And Systems For Improving The Operation Of Automatic Transmissions For Vehicles" (now U.S. Pat. No. 5,540,628, issued Jul. 30, 1996); U.S. Pat. No. 4,790,938, issued on Dec. 13, 1988 and entitled "Filter For Removing Particulate Matter From Fluid Within A Movable Body"; U.S. Pat. No. 4,711,140, issued Dec. 8, 1987 and entitled "Throttle Valve System For Automatic Transmission"; U.S. Pat. No. 4,449,426, issued on May 22, 1984 and entitled "Laminated Separator Plate Means For Recalibrating Automatic Transmission"; U.S. patent application Ser. No. 08/333,552, filed Nov. 2, 1994 and entitled "Methods And Systems For Improving The Operation Of Transmissions For Motor Vehicles"; U.S. patent application Ser. No. 08/494,844, filed Jun. 26, 1995 and entitled "Methods And Systems For Improving The Operation Of Transmissions For Motor Vehicles" (now U.S. Pat. No. 5,624,342,issued Apr. 29, 1997), and U.S. patent application Ser. No. 08/515,098, filed Aug. 14, 1995 and entitled "Methods And Systems For Improving The Operation Of Transmissions For Motor Vehicles". The basic operation of transmissions for automotive vehicles is discussed in the aforementioned patents and patent applications, and these patents and patent applications are expressly incorporated by reference into the disclosure of the present patent application.

The basic principles of operation of the factory installed General Motors 4L60E transmission for automotive vehicles, including the specific modes of operation thereof and the hydraulic circuits and interrelationship of hydraulic circuits, are well known to those skilled in the automotive transmission art. Attention is respectfully invited to the operations manual and text entitled *HYDRA-MATIC 4L60-E TECHNICAL GUIDE* (1992), published by General Motors Corporation, said publication describing in detail the operation of the "factory installed" 4L60E General Motors transmission, including a discussion of the structure, the hydraulic circuits, and the interrelationship between the structure and the hydraulic circuitry and fluid flow during normal operation of the transmissions in automotive vehicles. The disclosure of the aforementioned publication in its entirety is expressly incorporated by reference into the disclosure of the present patent application as disclosing and illustrating background material known to those of ordinary skill in the automotive transmission art.

A publication entitled "TRANSGO 4L60E-HD2 REPROGRAMMING KIT", is an instruction sheet describing the manner in which an automotive transmission mechanic implements the modifications to the 4L60E General Motors Corporation factory installed transmission to achieve the goals of the present invention. The disclosure of the aforementioned instruction sheet in its entirety (hereinafter referred to as "TRANSGO Publication") is also expressly incorporated by reference into the present patent application.

In the original design of the 4L60E "factory installed" transmission, the first gear ratio cannot be obtained above a vehicle speed of approximately 33-34 miles per hour. (See the aforementioned General Motors Corporation publication). A primary object of the present invention is to enable the driver of a vehicle having a 4L60E General Motors transmission to select first gear at any time, thereby enabling the driver to obtain a "first" gear ratio whenever the gear selector lever is placed in the "1" position without regard to the actual vehicle speed. This objective is accomplished by modification of the structure and operation of the existing hydraulic circuits of the original transmission and the addition of a new hydraulic circuits to the original transmission.

It is also desirable to modify the "factory installed" automotive transmission to result in quick application during upshifts and quick release forces during downshifts with minimum ratio sharing (overlap) during gear changes, for improved performance particularly when the vehicle is in heavy duty use. This object is obtained by varying the structure and operation of the hydraulic circuits of the original transmission to enlarge or reduce existing orifices to control the apply and release fluid flow through the hydraulic circuits, in conjunction with the modification of different spring and pressure values of the pre-existing hydraulic circuits of the factory installed transmission.

A further object of the present invention is to modify a "factory installed" 4L60E transmission, when designed for stick shift manual operation, to enable section of any gear ratio at any time, both with and without electronic controls.

Other objects, improvements and advantages of the present invention will become apparent to those skilled in the art from the following description in conjunction with the drawings.

SUMMARY OF THE INVENTION

Methods, apparatus and systems are provided for modifying the structure, operation, and functional relationship between structure in "factory installed" transmissions for automotive vehicles. In accordance with the present invention, the transmission identified as 4L60E installed in General Motors Corporation vehicles are modified to enable the driver to select any available ratio at any time, and in particular to enable the driver to obtain a first ratio whenever the gear selector is placed in the first position. In the original "factory installed" transmission, the first ratio cannot be obtained for vehicle speeds exceeding approximately 33-34 miles per hour. The original transmission is modified to achieve this result by removing an existing 1-2 shift valve from the original hydraulic circuitry, and replacing it with a new 1-2 shift valve providing a fluid flow path through the valve itself to increase fluid pressure applied to one side of the new valve to permit the transmission to obtain first gear ratio without regard to vehicle speed. The modification to the stick shift manual operation of the transmission enabling the selection of any gear ratio at any time without electronic controls includes the addition of a new 3-4 shift valve spring and the addition of a new 2-3 shuttle valve to adjust the pressure applied in the factory installed transmission to maintain maximum mainline pressure without electronic controls.

The present invention also modifies the aforementioned "factory installed" automotive transmission by producing quick "applies" and "releases" with minimum ratio sharing (overlap), which is advantageous in improving performance when the vehicle is used for heavy duty applications. These further modifications to the operation of the original transmissions are achieved by enlarging or reducing (or plugging) orifices in the original hydraulic circuitry to modify fluid flow therethrough for controlling the apply and release fluid flow. Additionally, adjustments are made to spring and pressure values of the original transmission hydraulic circuitry.

Accordingly, the object of the present invention is to modify the operation of existing "factory installed" automotive transmissions, and in particular the General Motors Corporation 4L60E transmission, to result in changes to the hydraulic circuitry and fluid flow therethrough to enable the driver of the vehicle to select any available ratio at any time in a stick shift manual operating mode without electronic controls, to select first gear ratio without regard to vehicle speed, and to produce quick "applies and releases" which are particularly advantageous for heavy duty applications. Other advantages and improvements of the methods, systems and apparatus of the present invention will become apparent to those skilled in the automotive transmission art from the following discussion in conjunction with the enclosed drawings.

BRIEF DESCRIPTION OF THE DRAWINGS

FIGS. 1A and 1B illustrate the hydraulic circuitry of the General Motors Corporation 4L60E automotive transmission for "Manual First", as it is factory installed;

FIG. 2A illustrates a new "1–2" shift valve, shown in greater detail than in FIG. 2, in accordance with the present invention; and FIG. 2B illustrates the relationship between the 2–3 shift valve and new 2–3 shuttle valve, shown in greater detail than in FIG. 2, in accordance with the present invention.

DESCRIPTION OF THE BEST MODES FOR CARRYING OUT THE INVENTION

The present invention is directed to improvements and modifications to existing "factory installed" automotive transmissions, and in particular the transmission known as General Motors Corporation 4L60E or Hydramatic 4L60E. The objects of the present invention include modification of the structure, hydraulic circuitry, interrelationship of structure and fluid flow patterns through the hydraulic circuitry of the original factory installed transmission for the purpose of 1). enabling the driver to select first gear ratio without regard to vehicle speed, 2). enabling the driver of the vehicle to select any available ratio at any time with or without electronic controls in stick shift manual operation, and 3). to control the fluid flow through the hydraulic circuitry in order to produce quick apply forces during upshifts and quick releases during downshifts with minimum ratio sharing (overlap) during gear changes. The modifications to the original operation and hydraulic circuitry of the "factory installed" automotive transmissions are made by removing structure including original valves, adding structure including new valves, adding new hydraulic circuits to the overall circuitry, discontinuing use of existing circuits by plugging; and modifying the flow through existing hydraulic circuitry by enlarging or reducing the size of fluid flow orifices and adjusting existing spring and pressure values.

The disclosure of the Applicant's prior U.S. Pat. Nos. 5,253,549; 4,790,938; 4,711,140; and 4,449,426 are expressly incorporated by reference into the disclosure of the present patent application. The disclosure of Applicant's currently pending Ser. Nos. 08/333,552, filed Nov. 2, 1994; 08/494,844, filed Jun. 26, 1995; and 08/515,098, filed Aug. 14, 1995 are also expressly incorporated by reference into the disclosure of the present patent application. Additionally, the disclosure of the aforementioned General Motors Corporation operating manual entitled *Hydra-Matic 4L60E Technician's Guide* (1992), which discloses in detail the structure and operation of the "factory installed" General Motors Corporation 4L60E automotive transmission, is expressly incorporated by reference into the disclosure of the present patent application as describing and illustrating basic operating principles and the hydraulic circuitry of the known automotive transmissions which constitute background information to the improvements of the present invention. The instruction sheet reproduced herein and entitled "TRANSGO 4L60E-HD2 REPROGRAMMING KIT", (hereinafter referred to as the "Transgo Publication"), which describes the manner in which the known conventional automotive transmissions are modified in accordance with the present invention, forms part of the disclosure of the present patent application.

Figure 1A:
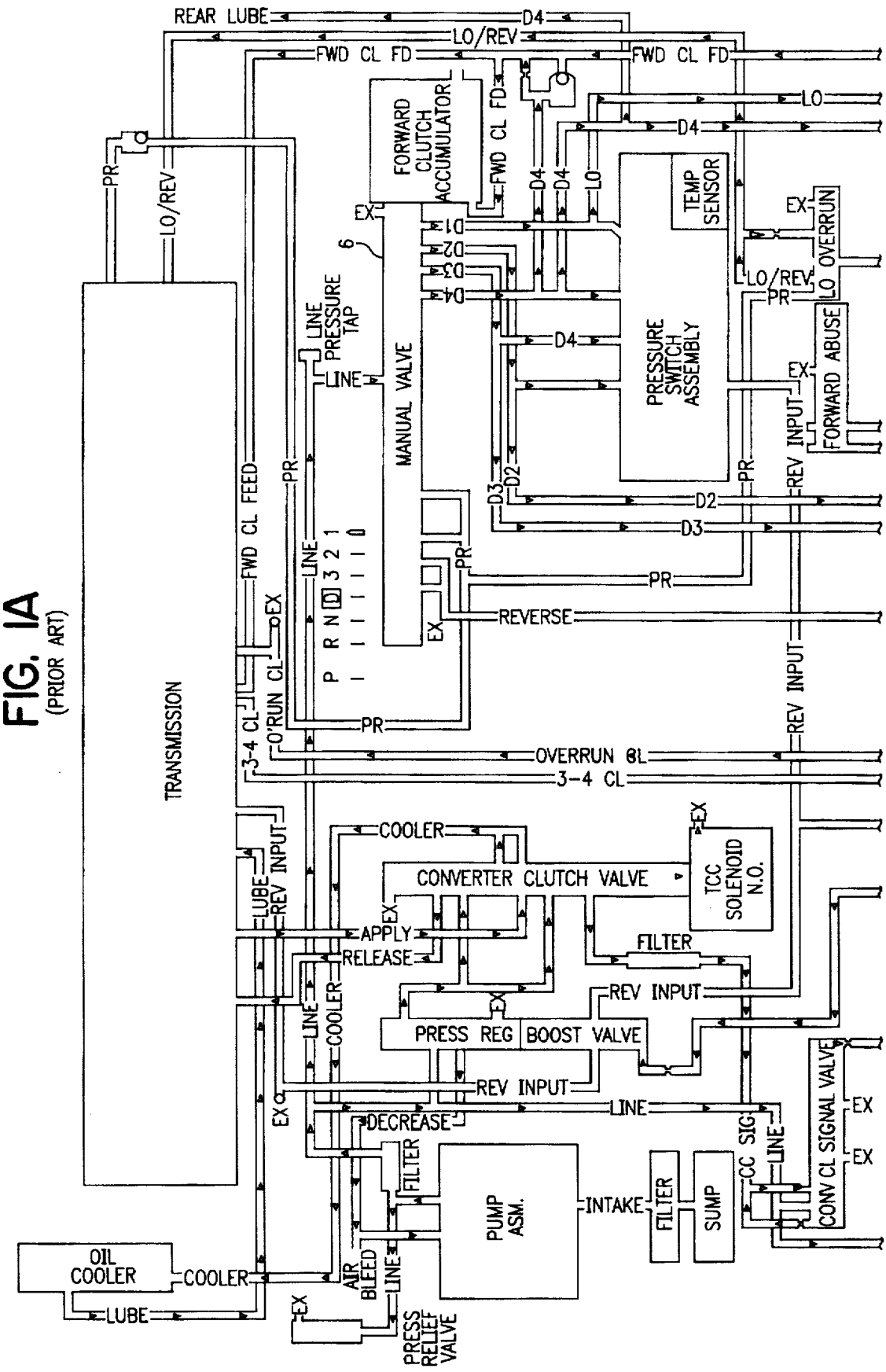
Figure 2A:
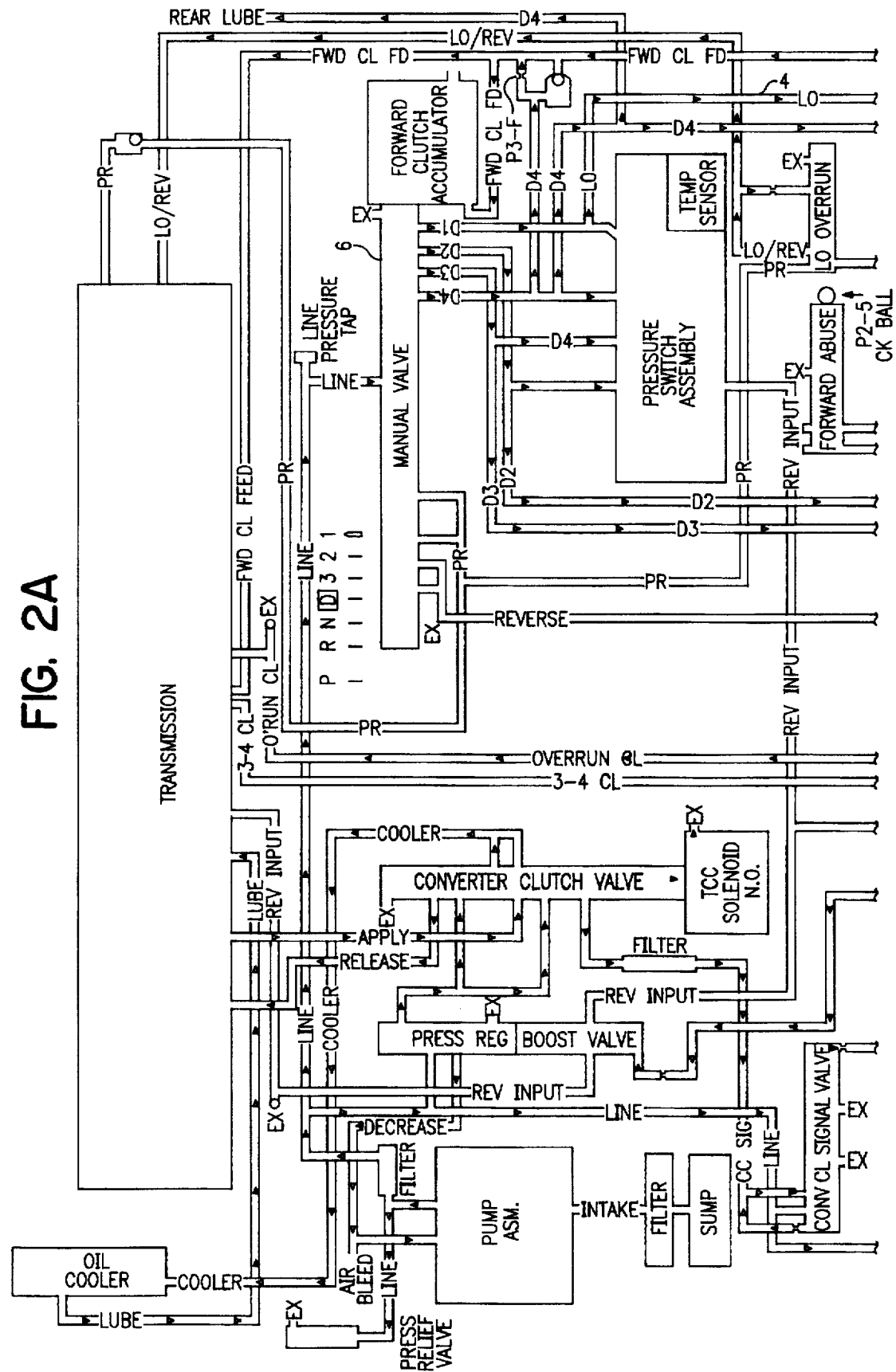
FIGS. 2A and 2B illustrate the hydraulic circuitry of the General Motors Corporation 4L60E automotive transmission for "Manual First", as modified in accordance with the present invention.
Figure 2B:
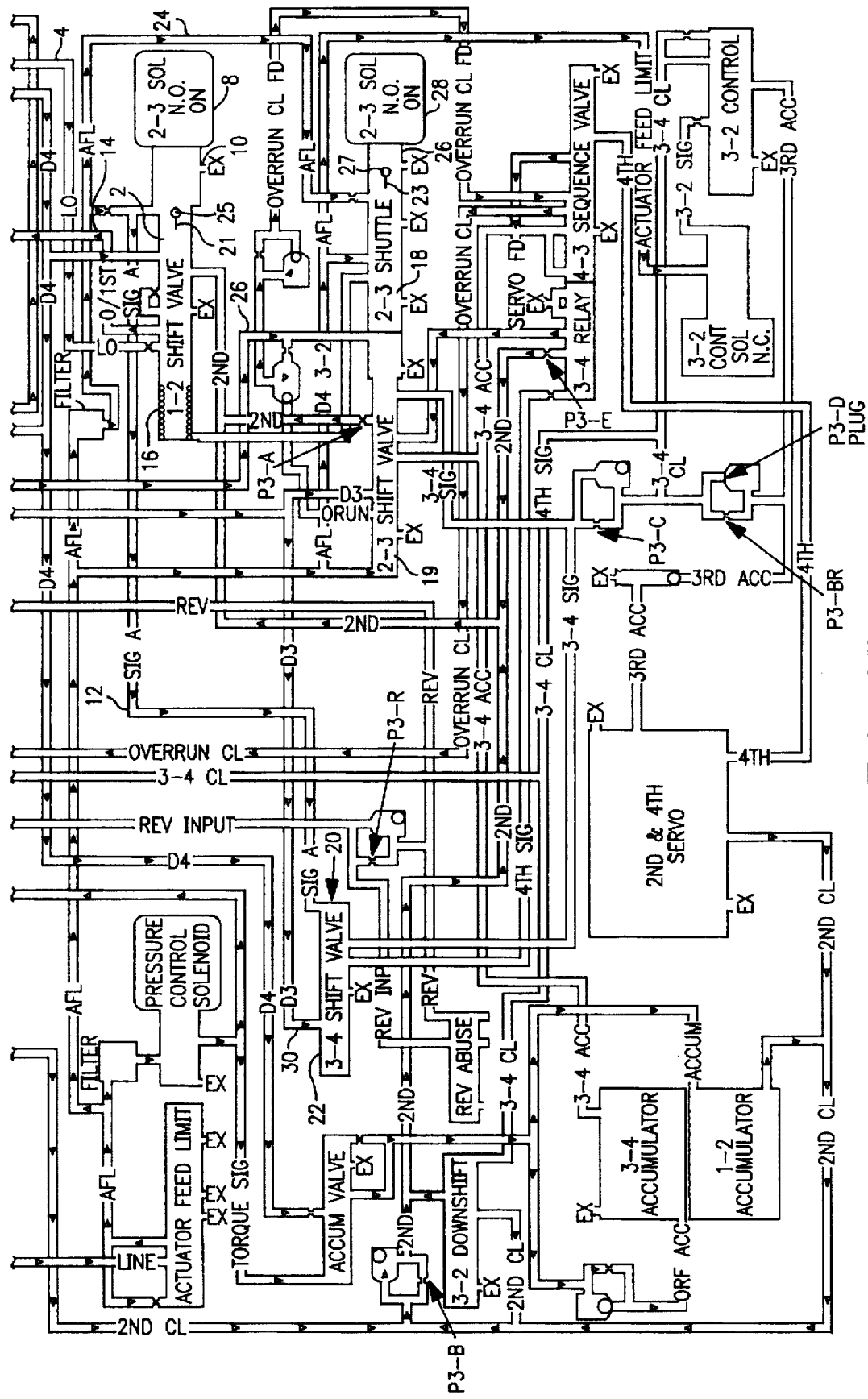

FIGS. 1A and 1B the prior art operation of the "factory installed" 4L60E transmission in "Manual First". The aforemention General Motors Corporation Publication *Hydra-Matic 4L60-E Technician's Guide* (1992) discusses and illustrates operation of the "factory installed" 4L60E transmission in "Manual Second", "Manual Third", "Overdrive Range—Third Gear", and "Overdrive Range—Fourth Gear TCC Applied". FIGS. 2A and 2B illustrates the 4L60E automotive transmission in "Manual First", as modified from the "factory installed" mode of operation in accordance with the present invention.

The prior art operation of the "factory installed" 4L60E automotive transmission will be briefly described as follows. Attention is directed to the *Hydra-Matic 4L 60-E Technician's Guide* General Motors Publication for a more detailed description of the operation of the "factory installed" transmission. Manual First is available to the driver when vehicle operating conditions require maximum engine compression to slow the vehicle, or maintain maximum transfer of engine torque to the vehicle drive shaft. Under normal operating conditions in Manual First, the transmission is prevented from upshifting past first gear. When Manual First is selected while operating in either second, third or fourth gears, the factory installed transmission will not immediately downshift into first gear. Vehicle speed must be below approximately 33 mph before the factory installed transmission will downshift into first gear. When the vehicle is operating above this speed, the transmission will operate in a Manual First—Second Gear condition until the vehicle speed decreases sufficiently. A downshift to first gear is controlled electronically by the PCM (Powertrain Control Module). The PCM will not energize a shift solenoid to initiate the 2-1 downshift until vehicle speed is below approximately 33 mph. Above this speed, the transmission will operate in a Manual First—Second gear condition until vehicle speed decreases below this rate. In Manual First, as in Manual Second, the factory installed transmission is electronically and hydraulically prevented from operating in third of fourth gears. Attention is directed to FIGS. 1A and 1B or the drawing illustrating the factory installed transmission in Manual First, and attention is further directed to the aforementioned General Motors publication for a more detailed description of the operation thereof.

The aforementioned General Motors Corporation Publication illustrates the "factory installed" 4L60E prior art transmission in its "Manual Second" mode of operation. The Manual Second gear range is available to the driver when vehicle operating conditions make it desirable to use only two gear ratios. These conditions include descending a steep grade when increased engine compression braking is needed, or to retain second gear when ascending a steep grade for additional engine performance. The factory installed transmission immediately shifts into second gear when Manual Second is selected regardless of vehicle speed. When Manual Second is selected by the driver, the transmission only operates in second gear and is prevented from operating in first, third and fourth gears. The transmission will immediately shift to second gear when Manual Second is selected. This allows the transmission to begin moving the vehicle in second gear to reduce the torque to the drive axle to reduce slippage on ice and water. To achieve Manual Second, the drive moves the gear selector lever into Manual Second which moves the selector shaft and manual valve into a Manual Second position. When this occurs, line pressure is routed through the manual valve and fills the manual D2 fluid circuit. Attention is directed to the aforementioned General Motors publication for a more detailed description of the operation of the factory installed transmission in Manual Second.

The aforementioned General Motors Corporation Publication illustrates the operation of the prior art "factory installed" 4L60E transmission in Manual Third. Manual Third is available to the driver when vehicle operating conditions make it desirable to use only three gear ratios. These conditions include towing a trailer or driving on hilly terrain. In Manual Third, the factory installed transmission is prevented from upshifting into Fourth Gear. Otherwise, upshifts and downshifts between First, Second and Third gears are the same as in the Overdrive range. If the transmission is in Fourth Gear when Manual Third is selected, the factory installed transmission will immediately downshift into third gear. Also, the overrun clutch is applied in Manual Third—Third Gear to provide engine compression braking. Attention is directed to the aforementioned General Motors Publication for a more detailed description of the operation of the factory installed transmission in Manual Third.

The aforementioned General Motors Corporation Publication illustrates operation of the "factory installed" 4L60E transmission in "Overdrive Range Third—Gear". As vehicle speed increases, the PCM monitors the various information centers to determine the precise moment to shift the transmission into Third Gear. In Third Gear, both planetary gear sets, input and reaction, rotate at the same speed and provide a 1:1 direct drive gear ratio between the converter turbine and output shaft. Engine torque is transmitted to the input sun gear in the same manner as in first and second gears. The forward clutch is applied and the forward sprag clutch drives the input sun gear. Attention is directed to the aforementioned General Motors Publication for a more detailed description of the factory installed transmission in the "Overdrive Range—Third Gear".

The aformation General Motors Corporation Publication illustrates the hydraulic circuitry of the prior art "factory installed" 4L60E transmission in "Overdrive Range—Fourth Gear TCC (Torque Converter Clutch) Applied" mode of operation. During such operation, the PCM continually monitors and receives input signals from various electrical devices both internal and external to the transmission. The PCM processes these signals and determines the precise moment to apply the converter clutch. These input signals include the following: vehicle speed sensor; transmission fluid temperature sensor; pressure switch assembly; throttle position sensor; engine speed; engine coolant temperature sensor; brake switch, four wheel drive low switch; air conditioning request; cruise control information; and manifold absolute pressure sensor. The PCM energizes the converter clutch solenoid when vehicle operating conditions are appropriate for converter clutch apply. This causes the following changes in the factory transmission hydraulic system: the normally TCC solenoid closes and blocks converter clutch signal fluid from exhausting through the solenoid; converter clutch signal fluid moves the converter clutch apply valve against spring force and into the apply position; convertor feed fluid is routed through the converter clutch apply valve and into the apply fluid circuit. At the same time, the release fluid circuit is open to an exhaust port past the valve; apply fluid flows between the converter hub and the stator shaft to maintain fluid pressure in the converter, and this fluid pressure applies the pressure plate against the converter cover to obtain TCC apply; as the pressure plate applies, release fluid exhausts between the converter cover and pressure plate. This fluid seats the TCC apply checkball and is orificed around the ball. Release fluid then flows through the turbine shaft between the stator shaft and turbine shaft, and past the converter apply valve. The checkball and orifice controls the exhaust rate of release fluid and the converter clutch apply rate; When the converter clutch apply valve is in the apply position, the cooler fluid circuit is fed by converter feed fluid through an orifice cap plug. The following conditions either prevent TCC apply or cause TCC release: engine coolant is below approximately 68 degrees Fahrenheit; transmission fluid temperature is below approximately 84 degrees Fahrenheit; throttle position is at minimum or maximum; and brake pedal is depressed. Attention is directed to the aforementioned General Motors Publication for a detailed description of the operation of the 4L60E factory installed transmission in "Overdrive Range—Fourth Gear TCC Applied" operation.

FIGS. 2A and 2B of the drawing illustrates the "factory installed" "Manual First" hydraulic circuit for the 4L60E transmission, as modified to result in the improvements in accordance with the present invention. To modify the factory installed transmission to permit selection of the first gear ratio without regard to vehicle speed (e.g., when the vehicle speed exceeds 33–34 miles per hour), the original "1–2" shift valve is replaced with a new "1–2" shift valve designated as reference numeral 2 in FIGS. 2A and 2B of the drawing. As illustrated, valve 2 provides a new hydraulic circuit which permits fluid flow through the center of the valve illustrated by the passageway designated as reference numeral 21 to couple "lo" oil from the lo oil passageway designated by reference numeral 4, to the right end of the valve 2 as shown in FIGS. 2A and 2B. As illustrated in the drawing, the lo oil passageway 4 provides a circuit for the flow of lo oil between a manual valve 6 and the "1–2" shift valve 2. The lo oil pressure now applied at the right end of the valve 2 causes the valve to move in a leftward direction (as shown in FIGS. 2A and 2B) when the gear selector is placed in the "First Gear" position. The increased lo oil pressure applied to the right end of new "1-2" shift valve holds the "1-2" shift valve in its downshifted position (i.e., to the left as illustrated in FIGS. 2A and 2B) without regard to the speed of the vehicle or the rotational speed of the engine.

In the "factory installed" transmission (FIGS. 1A and 1B), the "1-2" shift valve is allowed to upshift (e.g., move in a rightward direction as illustrated by FIGS. 1A and 1B) by electronically exhausting the "1-2" solenoid, designated as reference numeral 8 in FIGS. 2A and 2B, to prevent over-reving. Where applicable, the same reference numerals are used to designate common elements in FIGS. 1 and 2. The new "1-2" shift valve 2 as illustrated in FIGS. 2A and 2B (and illustrated in greater detail by FIG. 2A) is prevented from upshifting (moving rightwardly) by the flow of lo oil through the valve, as discussed above. The new "1-2" shift valve is designed such that the flow of lo oil therethrough is at a sufficient rate to overcome an open exhaust (designated by reference numeral 10 in FIGS. 2A and 2B) at the "1-2" solenoid 8 to prevent the "1-2" shift valve 2 from upshifting (i.e., moving in a rightward direction as illustrated in FIGS. 2A and 2B). A checkball 25 is provided on the right end of the "1-2" shift valve prevent solenoid pressure (represented by signal A passageway 12) from exhausting to atmosphere when the gear selector is not in the First Gear position.

When the gear selector is in the First Gear position, the modified transmission as illustrated by FIGS. 2A and 2B is not capable of upshifting because the new "1-2" shift valve is held downshifted (to the left in FIGS. 2A and 2B) by the pressure applied at the right end of the valve 2 by the flow of lo oil through the passageway provided in the new "1-2" shift valve. When the gear selector lever is moved out of the First Gear position, Manual "Lo/First" oil is exhausted through the passageway designated by reference numeral 14 in FIGS. 2A and 2B. With the gear selector lever in the Second Gear position, the "1-2" solenoid 8 is electronically opened, exhausting oil through the signal A passageway 12, thereby allowing the "1-2" shift valve 2 to move in a rightward direction (as seen in FIGS. 2A and 2B) as a result of the force applied by spring 16 resulting in the upshift of the transmission from First to Second gear. The original factory design of the transmission will hold Second Gear as long as the gear selector lever is in the Second Gear position, will hold Third Gear when the gear selector lever is in the Manual Third position, and will hold Fourth Gear when the gear selector lever is in the Overdrive position. This is accomplished by means of electronic controls in the "factory installed" automotive transmission.

In order to accomplish a further objective of the invention, to manually select any gear ratio at any time with or without electronic controls during stick shift (manual operation) of the transmission, as for example, in racing applications, the factory installed "2-3" shuttle valve is removed and replaced with a new "2-3" shuttle valve, which is designated by reference numeral 18 in FIGS. 2A and 2B of the drawing. The new "2-3" shuttle valve 18, and its relationship to the "2-3" shift valve designated by reference numeral 19, is illustrated in greater detail by FIG. 2B. The new "2-3" shuttle valve 18 is installed with a ¼ checkball end pin. Additionally, the factory installed "3-4" shift valve spring is removed, and a new "3-4" shift valve spring, designated by reference numeral 20 in FIGS. 2A and 2B of the drawing, is installed on the end of the "3-4" shift valve 22 which is the opposite end of the "3-4" shift valve on which the original factory installed spring acted. Operation of the modified transmission in the "stick shift" (manually operated) mode occurs with or without electronic controls. To allow for manual controls of upshifts with adequate mainline pressure without a computer, as for example in car racing applications, the command wires to the shift solenoids and the force motor (pressure regulator) are disconnected. Since both solenoids are normally open, AFL oil flow through the passageway designated by reference numeral 24 in FIGS. 2A and 2B is absent on the right end of the shift valves, thereby resulting in mainline pressure achieving its maximum value. The First Gear position is held by the action of the new "1-2" shift valve 2, as previously described herein.

In the Second Gear position, AFL solenoid pressure is absent and the new "2-3" shuttle valve 18 is prevented from upshifting (moving in a rightward direction as illustrated by FIGS. 2A and 2B) by feeding D2 oil from the D2 oil passageway designated by reference numeral 24 in FIGS. 2A and 2B through the center of the "2-3" shuttle valve 18 which is designed to apply D2 oil pressure at the right end of the valve 18 to prevent the valve from moving in a rightward direction as illustrated by FIGS. 2A and 2B. The flow of D2 oil through the passageway 23 defined in the "2-3" shuttle valve 18 is at a sufficient rate and to provide a sufficient quantity such that the oil pressure applied at the right end of the "2-3" shuttle valve 18 is sufficiently great to keep the valve 18 in a downshifted position (to the left in FIGS. 2A and 2B) notwithstanding the open exhaust orifice 26 at the "2-3" solenoid 28. A checkball 27 provided at the right end of the new "2-3" shuttle valve prevents any solenoid oil pressure (signal A) from exhausting to atmosphere when the gear selector lever in the Third Gear position.

The new spring 20 provided on the opposite end of the "3-4" shift valve 22 enables operation of the transmission in the "stick shift" manual operation mode with no electronic controls since no solenoid pressure is present in the system. The new "3-4" spring shifts the "3-4" shift valve to the left (as seen in FIGS. 2A and 2B) in the Overdrive position. In all other positions, D3 oil flowing through the D3 oil passageway designated by reference numeral 30 in FIGS. 2A and 2B holds the "3-4" shift valve 22 downshifted to the right as seen in FIGS. 2A and 2B. When electronic controls are used, signal A pressure from the solenoid is present in the hydraulic circuit. When no electronic controls are being used, which is common in racing applications, signal A oil pressure is absent from the hydraulic circuit.

If the operator of a vehicle wishes to maintain the ability to obtain First Gear at any time regardless of vehicle speed, and maintain the full race firmness of gear shifting, but also desires automatic upshifts and downshifts, the new "3-4" valve spring 20 installed on the right end of the "3-4" shift valve 22 can be removed, and the original factory installed "3-4" shift valve spring can be re-installed in the original "factory installed" position at the left end of the "3-4" shift valve. This can be accomplished without removing the valve body from the vehicle, and the new "2-3" shuttle valve 18 is not required to be replaced when converting back to automatic upshifts as a result of the new checkball provided on the right end of the new "2-3" shuttle valve 18. This allows conversion back to automatic operation (and not stick shift—manual operation), employing only a pan drop operation without having to remove the valve body from the vehicle.

Modification to the "factory installed" 4L60E transmission in accordance with the present invention also improves the performance of the transmission and provides correctly timed shifts. This result is achieved by increasing minimum and maximum mainline pressure (See page 3, item 8 of the Transgo Publication—step 8 results in a maximum line pressure approximately 10 psi higher than maximum line pressure in the "factory installed" transmission, and the new boost valve and bushing results in higher maximum pressure at wide open throttle operation for greater holding capacity), and adjusting orifice sizes and hydraulic circuitry in a "factory installed" transmission, as described below.

The orifice defined in the plate and designated as P3A in FIG. 2 is enlarged from a factory size of 0.083 inches in diameter to a diameter of 0.110 inches (See also page 3, item A in the Transgo Publication). The orifice P3B defined in the plate in the factory installed transmission is modified from the "factory installed" diameter range of 0.076 inches–0.096 inches to a new diameter of 0.076 inches (See page 3, item B of the Transgo Publication). Orifice P3C in the plate of the factory installed transmission is enlarged from the factory installed diameter of 0.098 inches to a new diameter in the range of between 0.110 inches–0.120 inches (See page 3, item C in the Transgo Publication). Orifice P3E in the plate of the factory installed transmission is modified from the factory installed diameter range of 0.056 inches–0.086 inches to a new diameter of 0.076 inches (See page 3, item E of the Transgo Publication). Orifice P3F in the plate of the factory installed transmission is modified from the factory installed diameter range of 0.052 inches–0.063 inches to a new diameter range of between 0.091 inches–0.096 inches (See page 3, item F in the Transgo Publication). Orifice P3R in the plate of the factory installed transmission is enlarged from a factory installed diameter in the range of 0.052 inches–0.063 inches to a diameter range of between 0.106 inches–0.116 inches (See page 3, item R in the Transgo Publication). The factory installed orifice designated as P3D is permanently plugged to prevent fluid flow therethrough (See page 3, item D in the Transgo Publication). The orifice designated as P3BR in the plate of the factory installed transmission is enlarged from the factory installed diameter of 0.110 inches to a diameter in the range of between 0.110–0.116 inches.

In addition to the above modifications, two washers may be installed in the front servo (See page 1, item 1 of the Transgo Publication) for eliminating the cushion spring stroke and allowing a firmer "1–2" shift. The red, yellow and blue springs (See page 1, item 2 of the Transgo Publication) are installed in the "1–2" accumulator. These springs result in a smoother "1–2" shift, yet provide for a shorter and firmer shift at hard throttle. Springs are installed in the forward accumulator (See page 2, step 6 of the Transgo Publication) and a 3/16 inch ball is installed into a torque valve spring to block the activity of the torque valve (See page 2, step 5 of the Transgo Publication). These adjustments to the "factory installed" transmission correct hot idle neutral to drive delay. Additionally, a spring can be installed at the fourth piston (See page 1, item B of the Transgo Publication) of the Transgo Publication) for pushing the torque piston in the direction of apply so that fourth gear will occur simultaneously with the movement of the gear selector lever into the overdrive (OD) position.

The modifications and revisions to the "factory installed" automotive transmission illustrated by FIGS. 2A and 2B of the drawing, the operation of which is disclosed and described more fully in the aforementioned General Motors publication, results in improvements to the operation of the automotive transmission by varying the fluid flow through the hydraulic circuitry to enable the operator of the vehicle to select first gear without regard to the speed of the vehicle, to enable the operator of the vehicle to select any gear at any time when the transmission is in a "stick shift—manual operation" mode, and to produce quick apply and release shifts with minimum ratio sharing (overlap) which is particularly useful for racing applications of the vehicle and generally improves the transmission performance by providing firmer and more correctly timed shifts. The improvements to the operation of the "factory installed" transmission are achieved by providing additional hydraulic circuits, eliminating pre-existing hydraulic circuits, adjusting fluid pressure and spring values, and enlarging and/or plugging orifices in fluid flow lines, as discussed herein.

Other improvements and modifications within the scope of the present invention will become apparent to those skilled in the art. Accordingly, the description of the preferred embodiments of the invention herein is intended to be illustrative only and not restrictive of the scope of the invention, that scope being defined by the following claims and all equivalents thereto.

I claim:

1. A method for modifying the hydraulic circuitry of an automotive transmission of the type including a manual valve coupled in fluid flow relationship to a "1–2" shift valve, a "2–3" shift valve, and a "3–4" shift valve; said manual valve being coupled to a gear selector; said method comprising the step of:

providing a fluid flow path through said "1–2" shift valve such that fluid flowing through said fluid flow path results in the application of fluid pressure to a side of said "1–2" shift valve for maintaining said "1–2" shift valve in a downshifted position without regard to vehicle speed when said gear selector is in a first gear position.

2. The method as claimed in claim 1 further including the step of providing a check ball at said end of said "1–2" shift valve at which said fluid pressure is applied for preventing exhausting of pressure from a "1–2" solenoid valve operatively associated with said "1–2" shift valve when said gear selector is in said first gear position.

3. The method as claimed in claim 1 further including the step of feeding fluid pressure through said fluid path defined in said "1–2" shift valve at a rate which is sufficient to overcome an open exhaust defined at a "1–2" solenoid operatively associated with said end of said "1–2" shift valve at which said fluid pressure is applied for preventing said "1–2" shift valve from upshifting when said gear selector is in said first gear position.

4. The method as claimed in claim 1 wherein said fluid flowing through said fluid flow path defined in said "1–2" shift valve is supplied to said "1–2" shift valve by a "low oil" passageway connecting said manual valve and said "1–2" shift valve.

5. The method as claimed in claim 1 further including the step of exhausting oil through said manual valve when said gear selector is moved out of said first gear position to hold second, third and fourth gear ratios when said gear selector is in corresponding second, third and fourth gear positions, respectively.

6. A method for modifying the hydraulic circuitry of an automotive transmission of the type including a manual valve coupled in fluid flow relationship to a "1–2" shift valve, a "2–3" shift valve, and a "3–4" shift valve; a "2–3" shuttle valve operatively associated with said "2–3" shift valve; and a gear selector coupled to said manual valve; said method comprising the steps of:

providing a fluid flow path through said "2–3" shuttle valve for applying fluid pressure to one end of said shuttle valve for maintaining said shuttle valve in its downshifted position when said gear selector is in a second gear position.

7. The method as claimed in claim 6 further including the step of providing a check ball at said one end of said "2–3" shuttle valve at which said fluid pressure is applied for preventing exhausting of said fluid applied to said fluid flow path through said "2–3" shuttle valve from an open solenoid exhaust of a "2–3" solenoid operatively associated with said end of said "2–3" shuttle valve at which said fluid pressure is applied.

8. The method as claimed in claim 6 further including the step of removing a spring acting on one end of said "3–4" shift valve of a "factory installed" transmission, and installing a spring to act on the opposite end of said "3–4" shift valve.

9. The method as claimed in claim 8 further including the step of applying a force by said newly installed "3–4" spring on said "3–4" shift valve to maintain said "3–4" shift valve in an upshifted position when said gear selector is in an overdrive position.

10. The method as claimed in claim 9 wherein the force applied by said newly installed "3–4" spring on one end of said "3–4" shift valve is overcome by oil pressure applied to said other end of said "3–4" shift valve to maintain said "3–4" shift valve in a downshifted position when the gear selector is in a position other than said overdrive position.

11. The method as claimed in claim 6 including the step of operating said transmission without the use of electronic controls for upshifting and downshifting gear positions.

12. The method as claimed in claim 8 further including the step of operating said transmission without the use of electronic controls for upshifting and downshifting gear positions.

13. The method as claimed in claim 6 including the step of providing a fluid flow path through said "1–2" shift valve such that fluid flowing through said fluid flow path results in the application of fluid pressure to a side of said "1–2" shift valve for maintaining said "1–2" shift valve in a downshifted position when said gear selector is in a first gear position.

14. The method as claimed in claim 8 including the step of providing a fluid flow path through said "1–2" shift valve such that fluid flowing through said fluid flow path results in the application of fluid pressure to a side of said "1–2" shift valve for maintaining said "1–2" shift valve in a downshifted position when said gear selector is in a first gear position.

15. A method for modifying the hydraulic circuitry of an automotive transmission of the type including a manual valve coupled in fluid flow relationship to a "1–2" shift valve, a "2–3" shift valve, and a "3–4" shift valve; and a gear selector coupled to said manual valve; the steps of said method including:

providing a fluid flow path through said "1–2" shift valve for applying fluid pressure to one end of said "1–2" shift valve for maintaining said "1–2" shift valve in a downshifted position when said gear selector is in a first gear position, and providing a fluid flow path through a "2–3" shuttle valve operatively associated with said "2–3" shift valve for applying fluid pressure to one end of said "2–3" shuttle valve for maintaining said "2–3" shuttle valve in a downshifted position when said gear selector is in a second gear position.

16. The method as claimed in claim 15 further including the step of:

applying a resilient force on said "3–4" shift valve sufficient to overcome applied fluid pressure to maintain said "3–4" shift valve in an upshifted position when said gear selector is in an "overdrive" position, said applied fluid pressure being sufficient to overcome said resilient force and maintain said "3–4" shift valve in a downshifted position when said gear selector is in a position other than said overdrive position.

17. The method as claimed in claim 15 further including the step of:

providing a check ball proximate to said one end of said "1–2" shift valve at which said fluid pressure is applied for preventing exhausting of fluid flowing through said "1–2" shift valve through an open exhaust at a solenoid operatively associated with said "1–2" shift valve when said gear selector is not in said first gear position.

18. The method as claimed in claim 15 further including the step of:

providing a check ball proximate to said one end of said "2–3" shuttle valve at which said fluid pressure is applied for preventing exhausting of fluid flowing through said "2–3" shuttle valve through an open exhaust at a solenoid operatively associated with said "2–3" shuttle valve when said gear selector is in a third gear position.

19. The method as claimed in claim 15 further including the step of:

applying said fluid pressure to said one end of said "1–2" shift valve by coupling a fluid flow passageway disposed between said manual valve and said "1–2" shift valve for permitting flow of applied oil through said "1–2" shift valve.

20. The method as claimed in claim 15 further including the step of:

applying said fluid pressure to said one end of said "2–3" shuttle valve by coupling a fluid flow passageway between said manual valve and said "2–3" shuttle valve for permitting flow of applied oil through said "2–3" shuttle valve.

* * * * *

UNITED STATES PATENT AND TRADEMARK OFFICE
CERTIFICATE OF CORRECTION

PATENT NO. : 5,743,823
DATED : April 28, 1998
INVENTOR(S) : Gilbert W. Younger

It is certified that error appears in the above-identified patent and that said Letters Patent is hereby corrected as shown below:

Column 3, Lines 36 - 41:

Delete Lines 36 - 41 in their entirety.

Figure 2C:
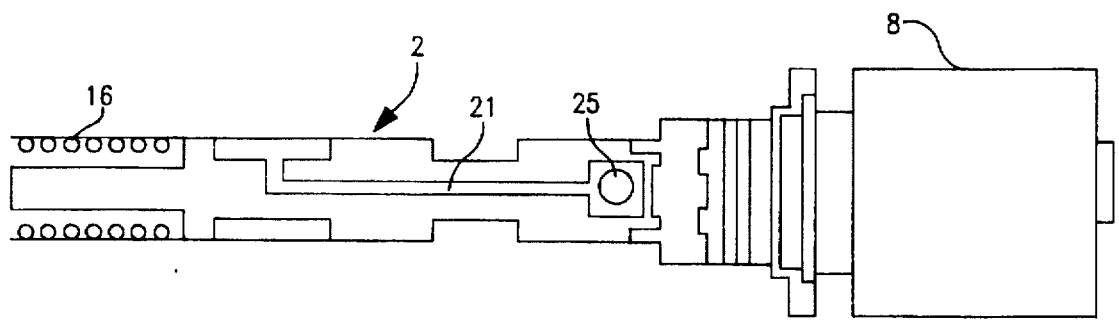
FIG. 2C illustrates a new 1–2 shifts valve, shown in greater detail than in FIGS. 2A and 2B, in accordance with the present invention.

Column 7, Line 15:

Delete "FIG. 2A" and substitute - -FIG. 2C- -.

Figure 2D:
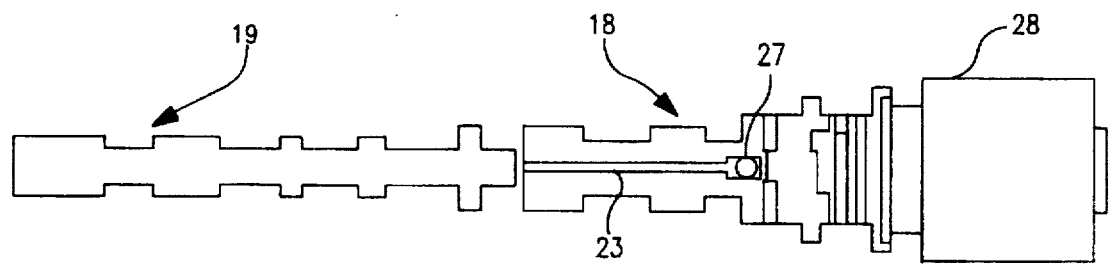
FIG. 2D illustrates the relationship between the 2–3 shift valve and a new 2–3 shuttle, shown in greater detail than in FIGS. 2A and 2B, in accordance with the present invention.

Column 7, Line 59:

Delete "FIG. 2B" and substitute - -FIG. 2D- -.

Signed and Sealed this

Twenty-first Day of July, 1998

Attest:

BRUCE LEHMAN

*Attesting Officer*  *Commissioner of Patents and Trademarks*